INVENTOR.
ERNST E. SCHUMACHER

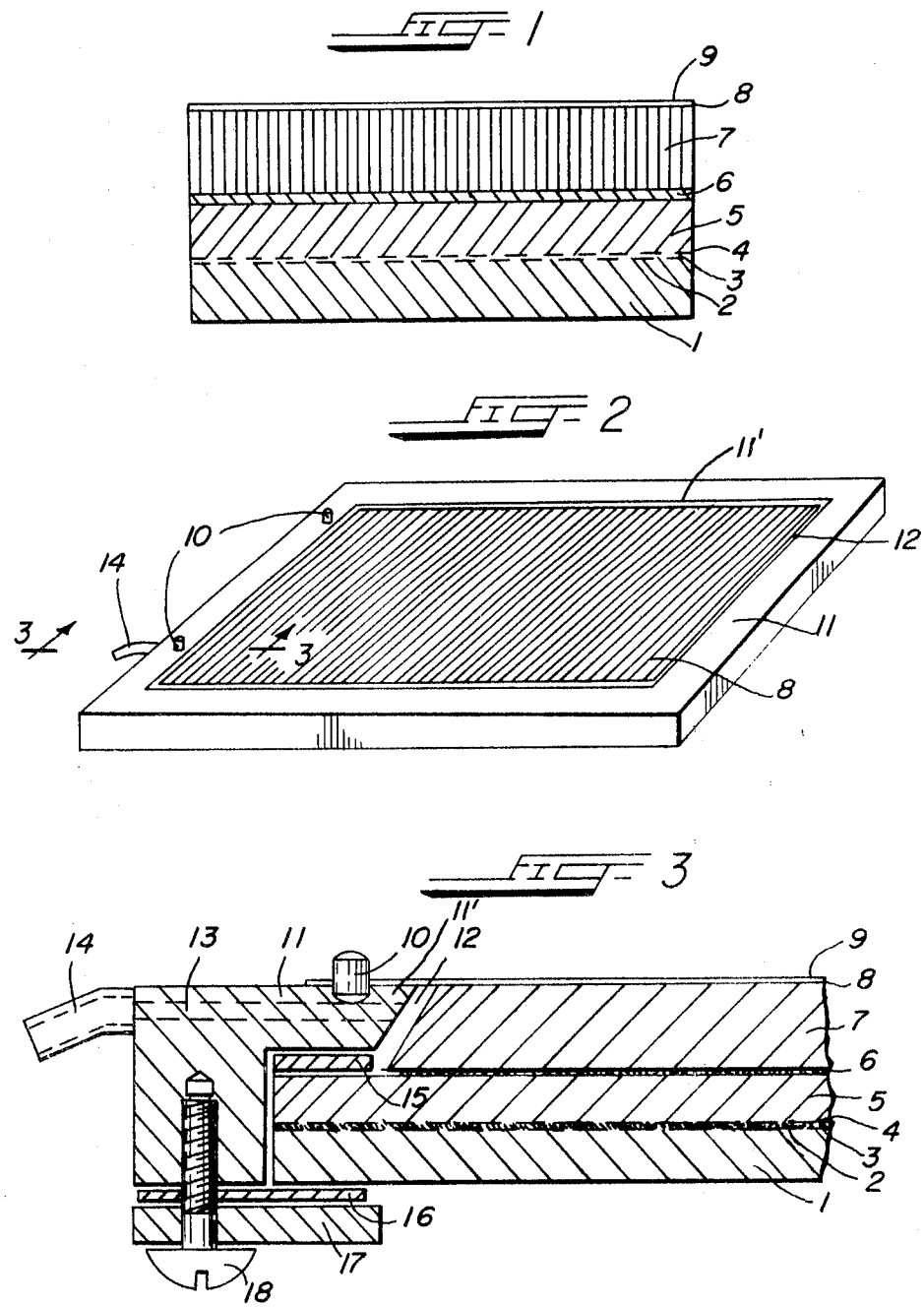

# United States Patent Office

3,597,217
Patented Aug. 3, 1971

---

3,597,217
COMBINATION HALFTONE SCREEN AND EMULSION POSITIONING PLATE
Ernst E. Schumacher, 3113 Postfach, 6 Frankfurt am Main, Germany
Filed Oct. 24, 1968, Ser. No. 770,301
Claims priority, application Germany, Oct. 24, 1967,
P 15 97 787.4
Int. Cl. G03f 5/00
U.S. Cl. 96—116                                14 Claims

ABSTRACT OF THE DISCLOSURE

A combination halftone screen and emulsion carrier plate whereby an independent photosensitive emulsion is accurately positioned in precisely spaced and parallel relation with the halftone screen grid.

BACKGROUND OF THE INVENTION

In photo-reproduction techniques a glass halftone screen is used for breaking up the continuous tones of an original into an almost countless number of dots. The size of the dots varies with the different amounts of light reflected from the different tones of the original and the usual crossline screen is placed in the path of rays within the process camera at 2 to 10 mm. from the sensitive emulsion. For this purpose process cameras are equipped with suitable devices for holding the screen and compensating for its thickness, i.e., adjusting the space between the crossline grid and the emulsion. The equipment of cameras with these devices is not only complicated and expensive but also calls for precision means for setting or adjusting the distance between the screen and the sensitive emulsion. This requires great experience on the part of the operator and often leads to errors. For this reason it is a primary object of the present invention to provide an improved means whereby, for any particular photo-reproduction procedure, the space between the screen grid and the photosensitive emulsion is invariable and the need for adjustment is unnecessary.

SUMMARY OF THE INVENTION

The inventive concept involved in the present invention is to provide a glass halftone screen rigidly combined with a removable carrier plate for accurately positioning and holding the sensitive emulsion to be exposed through the screen, and a frame for holding the screen and plate as a unit for use in the process camera. The carrier plate consists of clear transparent, highly polished, colorless glass of appropriate thickness and the frame is arranged to provide vacuum grooves, and if desired register pins or the like, enabling the operator to fix the sensitive emulsion at the required distance from the screen ruling and in the correct position in the image plane by merely mounting the emulsion against the polished outer surface of the carrier plate. This combination screen, in use, is simply placed into holders in the camera back so that the setting of the appropriate distance from the sensitive emulsion and the mechanically complicated parallel motion of a special screen holding device are no longer required.

In addition, my improved combination screen has the advantage that the glass surface in contact with the sensitive emulsion may be provided with an anti-reflection coating. While it is difficult to provide conventional glass halftone screens with such a coating, as they do not stand up to the required thermic treatment, the present invention proposes to provide the carrier plate with an anti-reflection coating while apart from the screen and to then cement the screen and carrier plate together.

It is well known in the art that the sensitive emulsion may be kept plane on the carrier plate by means of an elastic back. However, the preferred embodiment of my invention includes a vacuum-operated holder means. The sensitive emulsion is thus maintained against the carrier plate either directly by action of vacuum or by the intermediary of a superimposed foil. If film is pressed against polished glass plates Newton rings may occur, but the remedies known to those skilled in the art may also be applied to the improved combination screen.

DESCRIPTION OF THE DRAWINGS

Specific embodiments of my invention are shown in the accompanying drawings in which:

FIG. 1 is a fragmentary vertical sectional view of a typical screen and carrier plate assembly showing the relationship of the several elements thereof;

FIG. 2 is a perspective view of the improved screen and carrier plate assembly as combined in a mounting frame for use as a unit in a process camera;

FIG. 3 is a fragmentary sectional view of the same taken along the line 3—3 of FIG. 2;

DESCRIPTION OF THE PREFERRED EMBODIMENTS

Figure 4:
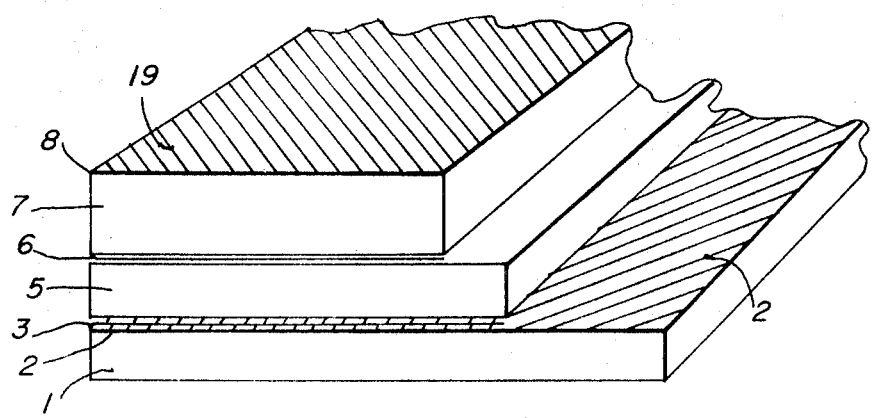
FIG. 4 is a schematic perspective view of a modified arrangement of the screen and carrier plate combination.

In all forms of the invention shown in the drawing, the glass halftone screen is combined with a carrier plate particularly adapted for positioning the sensitive emulsion, such as on photographic paper, or electro-photographic paper, or light sensitive emulsions on various supports such as aluminum foils, etc., for use as printing forms. As shown in FIG. 1, the plate assembly comprises a primary screen plate 1 which faces the camera lens (not shown) and which carries, for instance, parallel rules or otherwise formed lines 2. A second screen plate 5, carrying another series of parallel lines 4 is cemented onto the primary plate 1 by a suitable adhesive 3 which, for instance, consists of a self-hardening two-components cement such as a conventional epoxy resin adhesive. As shown, the second series of parallel lines 4 on the screen plate 5 are disposed at right angles with respect to the lines 2 on the primary plate 1. The screen plates 1 and 5, each bearing its respective parallel lines, form the halftone screen portion of the present invention and the carrier plate 7 is adhesively mounted onto the second screen plate by means of a cement layer 6 of a type, such as Canada Balsam, that will permit the two glass sheets 5 and 7 to be separated if necessary. The carrier plate 7 is generally of clear transparent glass having a plane outer surface 8 which serves for positioning the sensitive emulsion 9. As shown in FIG. 1, it will be seen that the combined thickness of the second screen plate 5 and the carrier plate 7 determines and positively fixes the distance between the halftone screen elements 2 and 4 and the photosensitive emulsion 9 and with the opposite face surfaces of the plates 5 and 7 being absolutely parallel with each other the image plane, comprising the emulsion 9, will be absolutely parallel with the grid formed by the halftone screen lines.

In the construction of the improved combination halftone screen and emulsion positioning plate of the present invention, it is recommended to first cement together the two ruled glass sheets which form the screen and to then mount the polished glass carrier plate onto the screen. Since the glass carrier plate may be subject to damage in the course of practical work it should be separably mounted, i.e., the cement should be chosen accordingly. It will be understood however that the combination of screen and carrier plate may also be purely mechanical, without any cementing, in such a way that the screen and/or glass carrier plate are interchangeable. The two glass plates or sheets, 1 and 5, forming the halftone screen, on the contrary, need not be detached from each other and are preferably permanently secured together.

It should also be understood that the glass carrier plate may be provided with a slightly mat surface and it may be provided with an anti-reflection coating, or the latter alone may be sufficient. Thus by providing for separation of the glass halftone screen and the carrier plate, a particular form of halftone screen may be combined with any one of several different kinds and thickness of emulsion carrier plate according to the dictates of the particular photo reproduction procedure involved.

The special halftone screen, according to this invention, may have any pattern, either lines, crosslines, spirals, rhomboids or grain. Preference is made, however, for screens which allow to obtain the desired gradation curve without requiring an additional highlight exposure (without screen).

As shown in FIG. 2 the assembly of glass plates 1, 5 and 7 are mounted in a frame 11 to complete the combination screen unit. As shown, frame 11 carries register pins 10 for positioning the sensitive material and the overhanging lip or flange 11' of the frame is dimensioned so that its outer edge is spaced from the plate 7 to provide a small peripheral groove or channel 12 for the vacuum system, the inner edge of the frame, adjacent to edge of the carrier plate 7, being connected to a vacuum unit (not shown) by means of a channel 13 leading to a connecting piece 14, as shown in FIG. 3. As shown in FIG. 3, the screen and carrier plate assembly is secured in the frame 11 by means of a flat bar 17, which by means of screws 18 and intermediary elastic strip 16 holds the screen assembly from the rear against the sealing gasket 15 located against the underside surface of the overhanging flange 11' of the frame. Thus when the photosensitive emulsion 9, or the foil bearing the same, is mounted on the face 8 of the carrier plate 7 so as to marginally overhang the groove or channel 12, the space provided by the channel 12 will be fully sealed and vacuum created by exhaustion of the space through the channel 13 and connecting piece 14 will result in a positive air pressure clamp of the emulsion 9 onto the surface of the carrier plate. Likewise, if the carrier plate 7 is not otherwise secured to the halftone unit 1–5 such exhaustion of the mounting frame 11 will result in an air pressure clamp of the carrier plate against the halftone screen plate 5.

For special jobs, the carrier plate 7 also may be provided with a screen ruling. In that case the dots appearing on the light sensitive emulsion are produced by the main screen, between plates 1 and 5, as a function of the tone values of the original and superimposed thereto is a negative or positive screen structure provided by the carrier plate 7. This variant of the present invention may be of particular interest for the production of gravure printing plates including textile printing as well as for the production of silk-screen printing foils or silk screen printing rollers. Even for letterpress the combination-screen offers a simple means for producing halftone negatives with a pin-point open highlight dot.

Such a screen is illustrated schematically in FIG. 4 and as shown, the carrier plate 7 is in this case provided with a screen ruling 19 on the emulsion carrying surface 8. In this case the primary screen plate has a set of parallel lines 2 extending at 45° to the front edge thereof, whereas the second glass sheet 5 of the screen has no ruling at all. Also, ruling 19 on the surface 8 of the carrier plate 7 stands at 135° to the front edge of the plate 7 so as to be at right angles to the screen ruling 2 on the plate 1.

Figure 5:
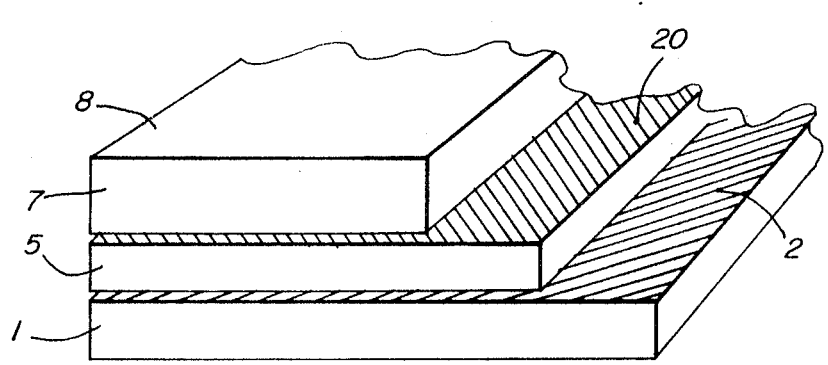
FIG. 5 is a schematic perspective view of another modified arrangement of the screen and carrier plate combination of the present invention.

Another variant of the combination halftone screen and emulsion positioning plate of the present invention is shown in FIG. 5 and in this form the halftone screen portion consists in the provision of two screen structures, or rulings, having different distances from the carrier plate. It is, for instance, an advantage to have one ruling in the plane where the two glass sheets comprising the halftone screen are cemented together and to have the other ruling in the plane where the halftone screen and the glass carrier plate are cemented together. Thus as shown in FIG. 5 the primary screen plate 1 has a set of parallel lines 2 at an angle of 45° with its front edge at the surface where the plates 1 and 5 are cemented together and the second screen plate 5 has a set of parallel lines 20 on the face against which the carrier plate 7 is mounted, the second set of parallel line being disposed at an angle 90° from the parallel lines 2. The two sets of parallel lines, or rulings, 2 and 20 are thus separated from each other by the thickness of the glass plate 5. It should be understood that the set of parallel lines 20 may be applied to either the plate 5 or the plate 7.

If, in addition, these screen structures or rulings are differently dyed, the screening effect may be produced either simultaneously or selectively, by interposing a filter in the path of the light rays during exposure, in order to control the gradation which, as is known in the art, depends upon the distance of the screen from the sensitive emulsion. Consequently, such a screen makes it possible to select various gradations to suit individual requirements.

I claim:

1. A combination halftone screen and emulsion carrier comprising an assembly of rigid transparent plates superposed one upon the other, an outer one of said plates having a plane surface on its exposed face, halftone screen grid lines on another of said plates and in a plane parallel with the said plane surface, said outer plate being of a thickness to space its exposed face at a predetermined distance from said grid lines, a frame for holding the said assembly of plates for mounting as a unit in a process camera, and means on said frame for removably securing a photosensitive emulsion flatly against the plane surface of the outer one of said plates.

2. A combination screen and emulsion carrier as defined by claim 1 wherein the said outer plate is provided with a screen ruling on one of its faces.

3. A combination screen and emulsion carrier according to claim 1 wherein the exposed plane surface of the said transparent outer plate is treated to make it antireflective.

4. A combination screen and emulsion carrier according to claim 1 wherein the said outer plate is separable from the assembly for replacement.

5. A combination screen and emulsion carrier according to claim 1 wherein at least two separate screen rulings are located at different distances respectively from the exposed plane surface of the said outer one of said plates.

6. A combination screen and carrier assembly according to claim 1 wherein the frame has an inwardly projecting peripheral flange the inner edge of which is spaced from the periphery of the outer one of said plates, and said frame is provided with means for connecting a vacuum source with the space between the said flange and said outer one of said plates.

7. A combination screen and carrier assembly according to claim 1 wherein the frame has registering pins normal to the plane of the exposed face of the outer one of said plates for locating the position of an emulsion surface thereon.

8. A combination halftone screen and emulsion carrier comprising a pair of transparent screen plates fixedly bonded together in face-to-face relation and having screen rulings on at least one of the bonded surfaces, a transparent carrier plate separably mounted in face-to-face relation with one of the first mentioned plates, said carrier plate having a plane outer face surface parallel with the plane of the said screen rulings, said screen plates extending beyond the periphery of the carrier plate on all sides, a frame surrounding and holding said screen plates and carrier plate as a unit, and means on said frame for holding an emulsion surface against the outer face of the carrier plate.

9. A combination screen and carrier plate according to claim 8 wherein the carrier plate is provided with screen ruling on one of its face surfaces.

10. A combination screen and carrier plate according to claim 8 wherein each of the screen plates is provided with screen ruling on at least one of its faces.

11. A combination screen and carrier plate according to claim 8 wherein a screen ruling is provided on the screen plate surface contiguous with the carrier plate.

12. A combination screen and carrier plate according to claim 8 wherein the carrier plate is provided with means on its outer surface to make it non-reflective.

13. A combination screen and carrier according to claim 8 wherein the frame has an inwardly projecting flange overhanging the margins of the screen plates and the inner edge of which is spaced from the periphery of the carrier plate.

14. A combination screen and carrier according to claim 13 wherein the means for holding an emulsion surface against the carrier plate comprises means for connecting a vacuum source with the space between said flange and the carrier plate.

References Cited
UNITED STATES PATENTS

| | | | |
|---|---|---|---|
| 2,532,701 | 12/1950 | Falconer et al. | 96—45 |
| 2,568,505 | 9/1951 | Maxwell | 96—116 |
| 2,692,198 | 10/1954 | Whitney | 96—116X |
| 2,981,625 | 4/1961 | Powers et al. | 96—116 |
| 2,984,566 | 5/1961 | Caine | 96—116X |
| 3,212,891 | 10/1965 | Longworth | 96—45X |
| 3,467,524 | 9/1969 | Gruver | 96—116 |

WILLIAM D. MARTIN, Primary Examiner

E. J. CABIC, Assistant Examiner